United States Patent [19]
Battaglia

[11] 4,078,767
[45] Mar. 14, 1978

[54] WIRE PULLING APPARATUS

[76] Inventor: Louis Battaglia, 23 Patricia Ave., Congers, N.Y. 10920

[21] Appl. No.: 666,761

[22] Filed: Mar. 15, 1976

[51] Int. Cl.² .................................... B65H 59/00
[52] U.S. Cl. ..................... 254/134.3 FT; 174/135
[58] Field of Search ............ 254/190 R, 134.3 R, 254/134.3 FT; 141/333, 334; 174/135

[56] References Cited

U.S. PATENT DOCUMENTS

| | | | |
|---|---|---|---|
| 2,838,280 | 6/1958 | Eyles | 254/134.3 FT |
| 3,005,620 | 10/1961 | Trunnell | 254/134.3 R |
| 3,052,450 | 9/1962 | Trunnell | 254/134.3 FT |
| 3,201,090 | 8/1965 | Jones | 254/134.3 FT |
| 3,363,879 | 1/1968 | Irik | 254/134.3 FT |

*Primary Examiner*—Trygve M. Blix
*Assistant Examiner*—Kenneth Noland
*Attorney, Agent, or Firm*—Stanley J. Yavner

[57] ABSTRACT

A wire pulling apparatus for use in pulling multi-cable wire through a conduit by means of a mechanical or manual pulling force. The conduit is provided at its entrance opening with a bushing including a matrix of grating elements to conform the wire cables to a predetermined pattern. A first reference for the pattern is established by encasing the wire cables at their leading ends in a basket-like device to which is attached a pulling cable leading through the conduit to the pulling element of the apparatus. The grating elements are rotatably inserted through radial holes provided in the bushing and are held in place by bending or threadably attaching nuts at the periphery of the bushing. Generally vertically oriented grating elements define notches for holding generally horizontally oriented grating elements. Furthermore, the bushing is provided with a smooth lip for preventing destructive contact with the wire cables.

1 Claim, 6 Drawing Figures

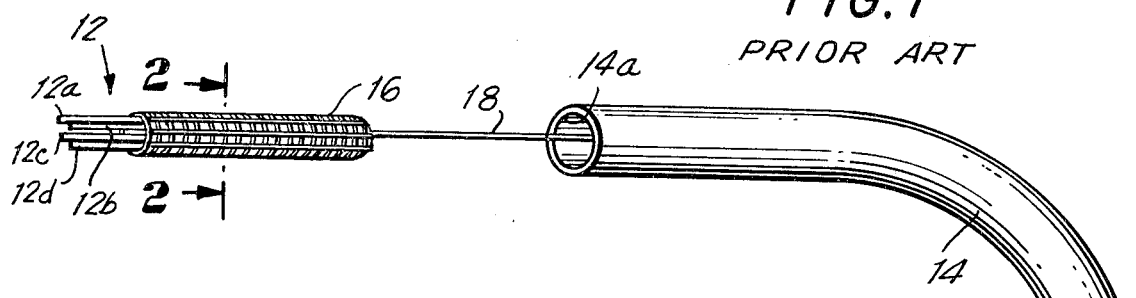
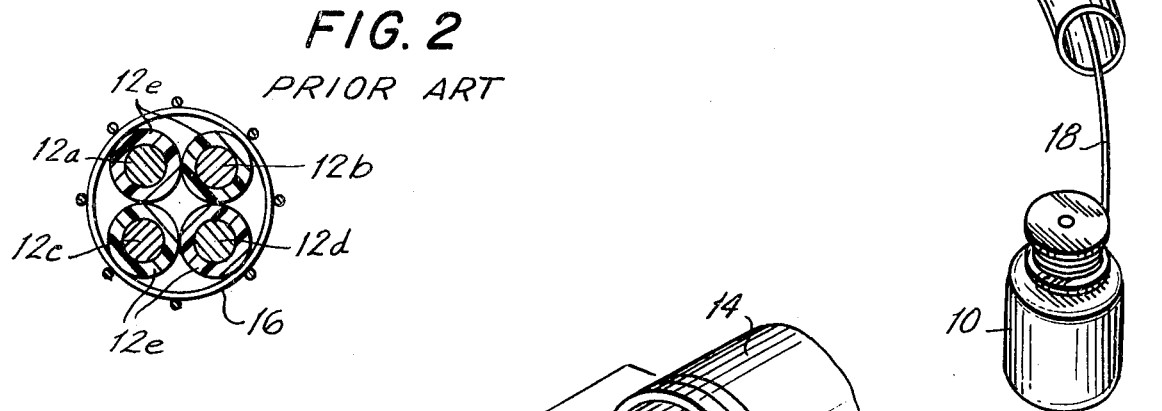
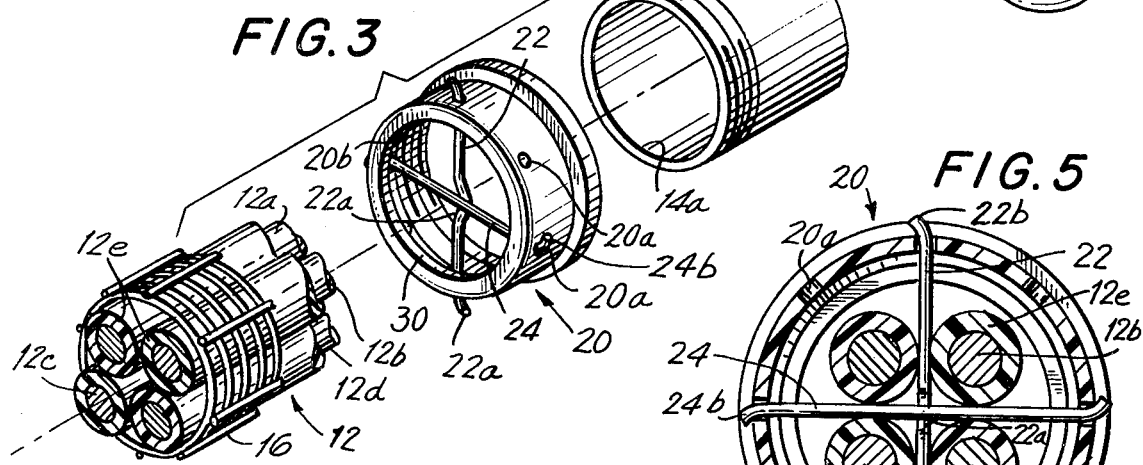
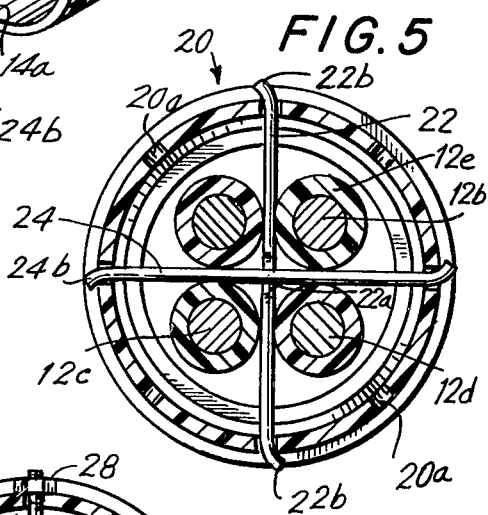
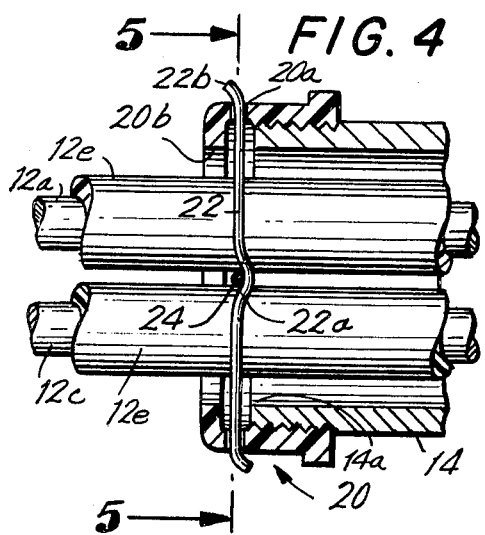
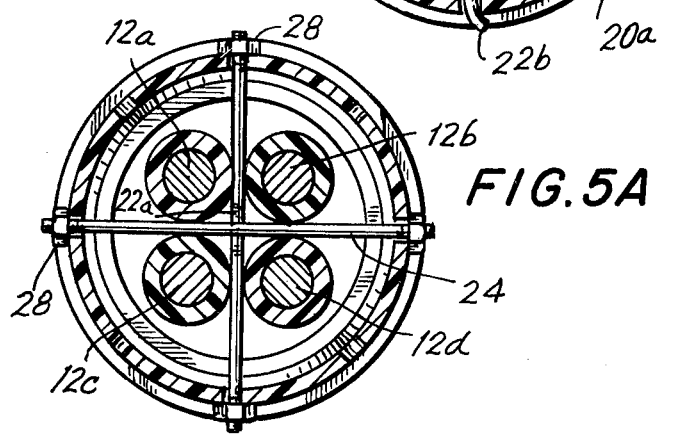

WIRE PULLING APPARATUS

This invention relates primarily to wire pulling apparatus and more specifically to wire pulling apparatus for use particularly with wire having a number of cables which must be arranged and pulled in a specific pattern.

The wire pulling art, as it relates to multicable pulling, now involves arranging a number of wire cables in a pattern with respect to each other, fixing the pattern of cables and pulling the fixed pattern through conduits or the like while attempting to maintain the pattern to prevent jamming. In order to accomplish the purposes of pulling such a pattern of cables, those skilled in the art have fixed a pattern of cables by use of a belt or basket at the leading end of the wire to be pulled, attached a pulling cable or the like to the belt or basket and inserted the pulling cable through the conduit for pulling by a motor or by manual means. However, common problems occur in this process; namely, the basket or wire might become jammed, particularly in a curved conduit. This leads inevitably to at least rearrangement of the wire cables, which in some cases causes loss of the pattern, twisting of one wire cable around the others and further jamming. Thus, the wire cables, having no other reference point, must be removed from the conduit, rearranged and fixed for reinsertion to the conduit. The same problems might occur if for any other reason the wire cables become twisted in the conduit. Still further, the basket or belt, to which the pulling cable is attached has been known to pull off completely from the wire strands to produce the same catastrophic results.

In its most common and understandable form, the wire pulling art may best be understood by reference to any means whereby a number of wire cables are pulled together through a conduit. Each wire cable is fed from a large spool and in most cases a pattern of four wire cables in a "box configuration" (two by two) is optimum when such cables are pulled through the same conduit. Therefore, the basket or belt is used to establish and maintain the configuration. However, as the basket or belt moves ahead, the lagging wire cable loses its pattern reference and can twist and jam. It may easily be seen that if so much as one wire cable were to lose its position in a pattern during the pulling operation because of the previously mentioned problems and drawbacks, the entire wire would have to be drawn out of the conduit, rearranged and then reinserted with the hope that further catastrophies would not result. Also, even without jamming, even slight loss of the pattern can produce rubbing of the cables on the apparatus and abrasion of the cable coatings.

Accordingly, a primary object of the present invention is to provide wire pulling apparatus wherein at least a second reference is provided for the multicable wire.

A further object of the present invention is to provide a wire pulling apparatus wherein abrasion of the wire cables and/or excessive frictional contact between the wire cables and the wire pulling apparatus is prevented.

A still further object of the present invention is to provide a wire pulling apparatus which is compatable with some of the wire pulling apparatus elements now available and which is simple, efficient and reliable.

These and other objects are accomplished in one preferred, but nonetheless illustrative, embodiment of the present invention which features a multi-cable wire pulling apparatus for use with a motor or the like to pull wire through a conduit. A basket or other pattern fixing mechanism is used to provide a first reference for the desired pattern by encircling the leading end of the multi-cable wire. A pulling cable is affixed to the basket, inserted through the conduit and fixed to the motor. A bushing is provided at the conduit entrance opening in a configuration that is enlarged somewhat in the pulling direction to accommodate a series of radial grating holes. The holes are arranged to receive grating elements arranged in a matrix configuration at the bushing entrance, with the grating elements being somewhat undersized with respect to the grating holes for rotatability. The ends of the grating elements are either bent at their ends or threadably inserted to nuts for holding the grating elements in place with respect to the bushing entrance. Certain of the grating elements, namely those arranged vertically, are provided with notches approximately at their mid-span in order to provide some support for the grating elements arranged approximately horizontally. Furthermore, the entrance lip of the bushing defines a relatively smooth surface. In this way, a number of wire cables are pulled through the conduit by actuation of the motor, attachment of the pulling cable to the motor, attachment of a basket or the like at the leading end of the wire to provide a first reference for the pattern of cables and the use of a bushing at the entrance opening of the conduit as described above. The smooth lip of the bushing prevents abrasion of the cable coatings and the rotatability of the grating elements resists excessive abrasion of such cables as they pass through the bushing. Still further, the matrix arrangement of the grating in conformity to the desired two by two pattern fixed by the basket, provides a second reference point to avoid the necessity for total rearrangement of the cables in the event of breakage of the pulling cable, breakage of the basket or other possibilities leading to loss of the pattern of cables established by the basket.

The above brief description as well as further objects, features and advantages of the present invention will be more fully appreciated by reference to the following detailed description of the preferred, but nonetheless illustrative, embodiment when taken in conjunction with the accompanying drawing wherein:

FIG. 1 is a pictorial representation of a wire pulling apparatus according to the prior art;

FIG. 2 is a sectional view, taken along the line 2—2 of FIG. 1 and showing particularly the pattern of wire cables fixed by the basket of FIG. 1 according to the prior art;

FIG. 3 is an exploded view of a bushing element and wire cables in a fixed pattern according to the present invention;

FIG. 4 is a partially sectional view of a bushing element with wire cables inserted thereto according to the present invention, showing particularly the establishment of a second reference point for the pattern of wire cables;

FIG. 5 is a sectional view taken along the line 5—5 of FIG. 4 and showing particularly the grating elements of wire pulling apparatus according to the present invention, said grating elements being held in position by bending the ends thereof; and FIG. 5A is a sectional view similar to that shown in FIG. 5, but with the grating elements being held in position by threading the ends thereof and using nuts attached thereto.

Referring to the drawing, wire pulling apparatus according to the present invention is shown to include a motor 10 or the like for pulling wire through a conduit 14. The wire 12 is multi-cable wire and includes a plurality of cables 12a, 12b, 12c, 12d, each cable being covered by a sheathing or coating 12e. A basket 16 is attached at the leading end of the multicable wire 12 and a pulling cable 18 is affixed to the basket and inserted through conduit 14 to enable pulling by motor 10. As indicated in FIGS. 1 and 2, the aforementioned apparatus is available in the prior art, but has suffered from serious drawbacks, since only a single reference point is established by the basket during the pulling operation. Thus, to reiterate, if rearrangement of the cables occurs, the multi-cable wire can become jammed and must be pulled out of the conduit 14, rearranged, refixed with respect to establishing a pattern and redrawn.

In order to alleviate such problems, the apparatus of the present invention establishes a second reference point for the pattern of the multi-cable wire 12, and yet is compatible with apparatus according to the prior art. Specifically, referring to FIGS. 3 through 5A, the apparatus of the present invention is detailed wherein a bushing, generally designated 20 is threadably or otherwise attached to the entrance opening 14a of conduit 14 to establish a second reference for the pattern of cables 12. Bushing 20 is slightly elongated in the direction of pulling when compared to bushings that might be used in prior art pulling apparatus. Accordingly, there is ample room for bushing 20 to define grating holes 20a for insertion therethrough of grating elements 22, 24. Grating elements 22, 24 are constructed to be slightly undersized with respect to grating holes 20a, so that they are rotatably inserted therethrough for purposes which will be described in more detail. Furthermore, vertical grating element 22 is constructed with a notch 22a at approximately its mid-point to aid in supporting horizontal grating element 24 under the weight of the cables.

FIG. 4 shows the establishment of the second reference point with more particularity. As an example, a matrix of four wire cables 12a–12d is established in a first reference by wire basket 16, as shown in FIG. 3. This matrix is matched in its pattern by the establishment of four grating openings as parts of a bushing opening 20b. Thus, after basket 16 passes the entrance of conduit 14, grating elements 22, 24 are inserted through bushing holes 20a to establish a second reference for the pattern of wire cables. The ends of grating elements 22, 24 are then bent into the configuration 22b, 24b, as shown in FIG. 5, in order to fix grating elements 22, 24 in a position with respect to bushing 20. Grating elements 22, 24 are constructed to be slightly undersized with respect to bushing holes 20a in order to provide the grating elements with rotatability. In this way, as cables 12a – 12d pass through the matrix established by grating elements 22, 24, the grating elements will rotate and thereby avoid abrasion of the cable sheathings 12e. Alternatively, (FIG. 5A) the ends of grating elements 22, 24 may be constructed with threads to enable insertion and fixing by nuts 28. Still further, bushing 20 is constructed to define a smooth lip 30 (FIG. 3) to again avoid abrasion of wire cables 12a–12d as they pass through the entrance of conduit 14.

Of course, only a four part matrix has been shown in the drawings of this application for clarity of presentation; however, it is possible to work with an eight-part matrix simply by providing additional bushing holes 20a and additional grating elements for the apparatus.

It should also be understood that the bushing 20 contemplated by the present invention may be anywhere from 2 to 5 inches or more in diameter to enable accommodation of wire cables for common situations in the wiring art.

In order to make the present invention more easily understood, a series of assembly and operational steps will now be described: A number of wire cables 12a – 12d are arranged in a desired pattern with a first reference established by encasing the leading end of such wire cables in a basket 16 which tightly fits over said wire cables. A pulling cable 18 is then attached to basket 16 and led through a conduit 14 to motor 10 or another convenient pulling element. After basket 16 completely passes entrance opening 14a defined by the conduit 14, grating elements 22, 24 are inserted through grating holes 20a defined by bushing 20, which had previously been threadably or otherwise attached to conduit 14. Grating elements 22, 24 are then bent at their ends to form configurations 22b, 24b as shown in FIG. 5, or, alternatively, if the grating elements are threaded at their ends, nuts 28 are attached to hold such grating elements in place. Thus, a second reference for the matrix of wire cables 12a–12d is established making jamming less likely for wire cables in conduit 14. If the basket 16 becomes jammed in a curve of conduit 14, thus loosening the basket's hold on the pattern of wire cables, a second reference enables holding of the pattern. For instance, bushing 20 may be unscrewed from conduit 14 and wire 12 removed along with the bushing from conduit 14. Basket 16 is then reapplied and the process repeated. In any event, the re-establishment of the pattern is conveniently enabled without the prior catastrophic results which occur with presently available wire pulling apparatus when the pattern is lost in the conduit 14.

Furthermore, it may be seen that abrasion of sheathing 12e is prevented by construction of the elements of the present invention. For instance, a smooth lip 30 is provided at the entrance of bushing 20, and grating elements 22, 24 are made for rotatable mating with bushing 20 in order to resist such abrasion.

Thus, a convenient, efficient and reliable wire pulling apparatus is provided by the present invention to be compatible with presently available such apparatus. On the other hand, an additional reference point for the pattern of wire cables is established to avoid catastrophic results.

What is claimed is:

1. A pulling apparatus for multi-cable wire for use with a pulling element to pull said wire through a conduit comprising a basket attached to said multi-cable wire at its leading end to provide a first reference for a pattern for said wire cables, a pulling cable through said conduit affixed at one of its ends to said basket and affixed at the other of its ends to said pulling element and a substantially cylindrical bushing defining a bushing opening and including grating elements at said opening to provide a second reference for said pattern, wherein said bushing further defines radial grating holes, said grating elements leading through said grating holes and establishing a matrix of cable openings at said bushing opening, wherein supporting means for said grating elements are provided of said grating holes and said grating elements are slightly undersized with respect to said grating holes to enable rotation of at least one of said grating elements as said wire cables are pulled thereover to prevent highly frictional contact between said grating elements and said cables.

* * * * *